United States Patent

Bühler et al.

[11] Patent Number: 5,428,138
[45] Date of Patent: Jun. 27, 1995

[54] RED 2,6-DICYANOPHENYLAZO DYES AND THE PREPARATION AND USE THEREOF

[75] Inventors: Ulrich Bühler, Alzenau; Margareta Boos, Hattersheim; Reinhard Kühn, Frankfurt am Main, all of Germany

[73] Assignee: Cassella AG, Frankfurt, Germany

[21] Appl. No.: 15,277

[22] Filed: Feb. 8, 1993

Related U.S. Application Data

[63] Continuation of Ser. No. 605,136, Oct. 29, 1990, abandoned, which is a continuation of Ser. No. 498,911, Mar. 26, 1990, abandoned.

[30] Foreign Application Priority Data

Apr. 6, 1989 [DE] Germany ............... 39 11 120.2

[51] Int. Cl.$^6$ .............. C09B 29/085; D06P 1/18
[52] U.S. Cl. ................. 534/854; 534/798; 534/847; 534/853
[58] Field of Search ............ 534/847, 853, 854, 798

[56] References Cited

U.S. PATENT DOCUMENTS

| | | | |
|---|---|---|---|
| 3,962,209 | 6/1976 | Gotteschlich et al. | 534/854 X |
| 4,035,143 | 7/1977 | Heinrich et al. | 534/854 X |
| 4,087,420 | 5/1978 | Heinrich et al. | 534/854 |
| 4,448,719 | 5/1984 | Schwander | 534/854 X |

FOREIGN PATENT DOCUMENTS

| | | | |
|---|---|---|---|
| 2308044 | 8/1974 | Germany | 534/854 |
| 63-39965 | 2/1988 | Japan | |
| 479678 | 11/1969 | Switzerland | 534/854 |

*Primary Examiner*—Mary C. Lee
*Assistant Examiner*—Fiona T. Powers
*Attorney, Agent, or Firm*—Connolly & Hutz

[57] ABSTRACT

The azo dyes of the formula I

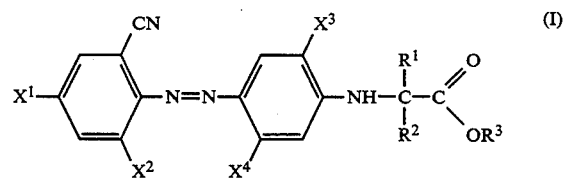

where
$X^1$ is for example hydrogen or ($C_1$ to $C_6$)alkyl,
$X^2$ is cyano or nitro,
$X^3$ is for example hydrogen or ($C_1$ to $C_4$)alkoxy,
$X^4$ is for example ($C_1$ to $C_4$)alkoxy, chlorine or hydrogen,
$R^1$ is hydrogen or ($C_1$ to $C_6$)alkyl,
$R^2$ is hydrogen or ($C_1$ to $C_6$)alkyl and
$R^3$ is for example ($C_1$ to $C_8$)alkyl, are highly suitable for dyeing and printing hydrophobic fiber materials.

11 Claims, No Drawings

RED 2,6-DICYANOPHENYLAZO DYES AND THE PREPARATION AND USE THEREOF

This is a continuation of Ser. No. 07/605,136, filed Oct. 29, 1990 now abandoned, which in turn was a continuation of Ser. No. 07/498,911, filed Mar. 26, 1990, now abandoned.

The present invention relates to useful new azo dyes which are free of ionic groups and have the general formula (I)

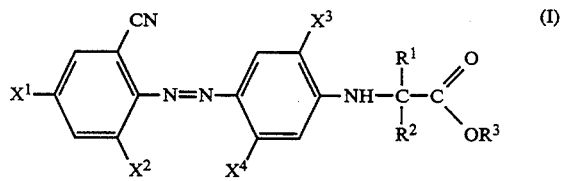

where $X^1$ is hydrogen, ($C_1$ to $C_6$)alkyl, cyclopentyl, cyclohexyl, fluorine, chlorine, bromine, trifluoromethyl or ($C_1$ to $C_4$)alkoxy which may be substituted by ($C_1$ to $C_4$)alkoxy and/or hydroxyl, $X^2$ is cyano or nitro, $X^3$ is hydrogen, chlorine, methyl, ($C_1$ to $C_4$)alkoxy or ($C_1$ to $C_4$)alkoxy substituted by ($C_1$ to $C_4$)alkoxy, $X^4$ is $NHCOR^4$, $NHSO_2R^5$, methyl, ($C_1$ to $C_4$)alkoxy, chlorine or hydrogen, $R^1$ is hydrogen or ($C_1$ to $C_6$)alkyl, $R^2$ is hydrogen or ($C_1$ to $C_6$) alkyl, $R^3$ is ($C_1$ to $C_8$)alkyl, ($C_1$ to $C_8$)alkyl which may be interrupted by one or more oxygen atoms and/or is monosubstituted or polysubstituted by chlorine, bromine, cyano, hydroxyl, phenyl, phenoxy, ($C_1$ to $C_8$)alkoxy, ($C_3$ to $C_5$)alkenyloxy, cyclopentyloxy, cyclohexyloxy, tetrahydrofurfuryl, tetrahydrofurfuryloxy, ($C_1$ to $C_4$)alkyltetrahydrofurfuryl, tetrahydropyronyl, ($C_1$ to $C_4$)alkyltetrahydropyronyl, ($C_1$ to $C_4$)alkoxycarbonyl, ($C_1$ to $C_4$)alkoxycarbonyloxy, ($C_1$ to $C_4$)alkylcarbonyloxy, ($C_3$ to $C_5$)alkenyloxycarbonyl, ($C_3$ to $C_5$)alkenyloxycarbonyloxy, cyclopentyloxycarbonyl, cyclohexyloxycarbonyl, phenoxycarbonyl, phenoxycarbonyloxy and/or phenylcarbonyloxy, of which phenoxycarbonyl, phenoxycarbonyloxy and phenylcarbonyloxy may each be monosubstituted or polysubstituted in turn by ($C_1$ to $C_4$)alkyl, chlorine, bromine and/or cyano, or is ($C_3$ to $C_5$)alkenyl, cyclopentyl, cyclohexyl, tetrahydrofurfuryl, benzyl, benzyl which is monosubstituted or polysubstituted by chlorine, bromine, nitro, cyano, ($C_1$ to $C_4$)alkyl and/or ($C_1$ to $C_4$)alkoxy, phenyl or ($C_5$ to $C_6$)alkyl which is interrupted by 2 or 3 oxygen atoms, $R^4$ is ($C_1$ to $C_8$)alkyl which may be monosubstituted or polysubstituted by fluorine, chlorine, bromine, hydroxyl or ($C_1$ to $C_4$)alkoxy, phenyl, ($C_1$ to $C_4$)alkoxy or phenoxy, and $R^5$ is ($C_1$ to $C_8$)alkyl.

The invention also relates to mixtures of dyes of the general formula I, to the preparation of these dyes and their mixtures, and to the use thereof for dyeing hydrophobic fibre materials.

Alkyl, alkoxy, alkenyloxy and alkenyl radicals can be straight-chain or branched. This also applies if they are substituted and/or appear as substituents on other radicals or in conjunction with other radicals, for example as alkoxycarbonyloxy or alkenyloxycarbonyloxy.

The preferred degree of substitution is monosubstitution. The preferred degree of polysubstitution is disubstitution.

Radicals $R^3$ are for example 2-chloroethyl, 2-bromoethyl, 2-cyanoethyl, 2-phenethyl, 3-chloropropyl, 3-bromopropyl, 3-phenylpropyl, 2-hydroxyethyl, 2-phenoxyethyl, 2- or 3-hydroxypropyl, 2- or 3-hydroxybutyl, 2- or 3-phenoxypropyl, 2- or 3-phenoxybutyl, 2,3-dihydroxypropyl, 2,3-dihydroxybutyl, 3-chloro-2-hydroxypropyl, 2-acetoxyethyl, 4-acetoxybutyl, 2-propionyloxyethyl, 2-butyryloxyethyl, 4-butyryloxybutyl, 2-methoxycarbonylethyl, 3-methoxycarbonylethyl, 3-propoxycarbonylpropyl, 3-i-propoxycarbonylpropyl, 4-butoxybutyl, 2-phenylcarbonyloxyethyl, 5-phenylcarbonyloxypentyl, 2-phenoxycarbonyloxyethyl, 3-phenoxycarbonyloxypropyl, 2-allyloxycarbonyloxyethyl, 3-methallyloxycarbonyloxypropyl, 4-propenyloxycarbonyloxybutyl, 2-(1-, 2- or 3-butenyl)oxycarbonyloxyethyl, 2-methoxycarbonyloxyethyl, 3-i-propoxycarbonyloxypropyl, 4-butoxycarbonyloxybutyl, 2-(2- or 3-tetrahydrofurfuryl)ethyl, 2-(3-ethyltetrahydro-2-furfuryl)ethyl, 2-(tetrahydro-4-pyron-2- or -3-yl)ethyl, 3-(2-ethyltetrahydro-4-pyron-3-yl)propyl, 2-methoxyethyl, 3-methoxypropyl, 3-methoxy-2-methylpropyl, 2-ethoxyethyl, 3-i-propoxypropyl, 4-i-butoxy-2-methylpropyl, allyl, methallyl, propenyl, crotyl(=2-butenyl), 1- or 3-butenyl, 2-allyloxyethyl, 3-methallyloxypropyl, 2-allyloxycarbonylethyl, 4-methallyloxycarbonylbutyl, 2-hydroxy-3-methoxypropyl, 2-hydroxy-3-ethoxypropyl, 2-hydroxy-3-i-propoxypropyl, 2-hydroxy-3-propoxypropyl, 2-hydroxy-3-butoxypropyl, 2-hydroxy-3-phenoxypropyl, 2-acetoxy-3-methoxypropyl, 2-acetoxy-3-ethoxypropyl, 2-acetoxy-3-propoxypropyl, 3-acetoxy-3-butoxypropyl, 2-acetoxy-3-phenoxypropyl, 2-ethoxyethyl, benzyl, 4-chloro-, 4-bromo-, 4-nitro-, 4-cyano-, 4-methyl- or 4-methoxy-benzyl, 2-, 3- or 4-ethoxybenzyl, 2,3-dichlorobenzyl, $-CH_2CH_2OCH_2CH_2OC_2H_5$, $-CH_2CH_2OCH_2CH_2OCH_2CH_2OC_2H_5$, $-CH_2CH_2OCH_2CH_2OCH_3$, $-(CH_2CH_2O)_3-CH_3$; $-(CH_2CH_2O)_3-n-C_3H_7$, $-(CH_2CH_2O)_3-i-C_3H_7$, $-(CH_2CH_2O)_2-n-C_4H_9$, $-(CH_2)_3O-(CH_2CH_2O)_2-CH_3$, $-(CH_2CH_2O)_2-C_6H_5$, $-CH_2CH_2O-n-C_4H_9$, $-(CH_2CH_2O)_2-CO-CH_3$.

Examples of alkyl groups of 1 to 8 carbon atoms in the radicals $X^1$, $R^1$, $R^2$, $R^3$, $R^4$ and $R^5$ are: methyl, ethyl, n-propyl, i-propyl, n-butyl, i-butyl, sec. -butyl, tert. -butyl, n-pentyl, i-pentyl, n-hexyl, i-hexyl, 2,3-dimethylbutyl, n-heptyl, i-heptyl, n-octyl, i-octyl, 3-methylheptyl, 2-methylbutyl, 2-ethylbutyl, 2-methylpentyl, 3-methylpentyl and 2-ethylhexyl.

Examples of alkoxy groups in the radicals $X^1$, $X^3$ and $R^4$ are: methoxy, ethoxy, n-propoxy, i-propoxy, n-butoxy, i-butoxy, sec.-butoxy, tert.-butoxy, n-pentoxy, i-pentoxy, 2-methylbutoxy, n-hexoxy, i-hexoxy, 2,3-dimethylbutoxy, 2-ethylbutoxy, 2-methylpentoxy, 3-methylpentoxy, n-heptoxy, i-heptoxy, n-octoxy, i-octoxy and 2-ethylhexoxy.

A preferred radical $X^2$ is CN. Preferred combinations of $X^4/X^3$ are H/alkoxy of 1 to 4 carbon atoms, H/Cl, Cl/alkoxy of 1 to 4 carbon atoms, methyl/alkoxy of 1 to 4 carbon atoms, alkoxy of 1 to 4 carbon atoms/alkoxy of 1 to 4 carbon atoms, Cl/H, $NHSO_2R^5$/Cl. Particularly preferred combinations $X^4/X^3$ are H/H, methyl/H, alkoxy of 1 to 4 carbon atoms/H, $NHCOR^4$/Cl, NHSO$_2$R$^5$/H. A particularly preferred combination X$^4$/X$^3$ is NHCOR$^4$/H.

Preferred radicals X$^1$ are hydrogen, alkyl of 2 or 3 carbon atoms, alkoxy of 2 to 4 carbon atoms. Particularly preferred radicals X$^1$ are methyl, fluorine, chlorine, bromine, trifluoromethyl and methoxy.

Preferred alkoxy X$^3$ is methoxy or ethoxy.

Preferred R$^4$ in X$^4$=NHCOR$^4$ is (C$_1$-C$_6$)alkyl, in particular (C$_1$-C$_4$)alkyl. Particularly preferred R$^4$ is propyl, in particular n-propyl, when X$^3$ is at the same time H, or methyl or ethyl when X$^3$ is at the same time (C$_1$-C$_4$) alkoxy which may be substituted by (C$_1$-C$_4$) alkoxy.

Preferred R$^5$ in X$^4$=NHSO$_2$R$^5$ is alkyl of 1 to 4 carbon atoms.

Preferred R$^1$ is alkyl of 1 to 4 carbon atoms, and particularly preferred R$^1$ is alkyl of 1 to 3 carbon atoms.

Preferred R$^2$ is (C$_1$-C$_4$)alkyl, in particular (C$_1$ or C$_2$)alkyl.

Preferred R$^3$ is alkyl of 1 to 8 carbon atoms, phenyl-substituted alkyl of 1 to 3 carbon atoms, cyano- or chlorine-substituted alkyl of 2 or 3 carbon atoms, alkyl of 2, preferably 3 to 4 carbon atoms substituted by alkoxy of 1 to 4 carbon atoms, alkenyloxy of 3 to 5 carbon atoms or phenoxy, or alkenyl of 3 to 5 carbon atoms.

Preferred dyes of the general formula I are those which contain preferred X$^1$, X$^2$, X$^3$, X$^4$, R$^1$, R$^2$ and R$^3$ and preferred combinations of X$^4$ and X$^3$.

The dyes according to the invention are red. Similar blue dyes are already known and described in DOS 2,254,017. Similar red dyes are claimed for example in DOS 1,794,402 or in Japanese Patent Application J6 3051460.

However, it has been found, surprisingly, that the dyes according to the invention are clearly superior to these known dyes in dyeing characteristics on various substrates and in some important application and performance fastness properties, such as pH sensitivity, wash fastness and in particular light fastness and fastness to dry heat pleating and setting.

The dyes according to the invention are preferably prepared by subjecting an azo dye of the formula II

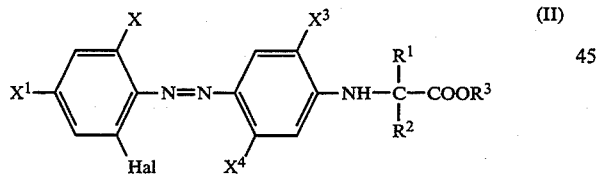

(II)

where X$^1$, X$^4$, X$^3$, R$^1$, R$^2$ and R$^3$ are each as defined above, X is cyano, nitro or hal and hal is halogen such as chlorine or in particular bromine, in a conventional manner, for example as described in DE-A-1809920, DE-A-1809921, GB-B-1184825, DE-B-1544563, DE-A-2310745, DE-B-2456495, DE-B-2610675, DE-A-2724116, DE-A-2724117, DE-A-2834137, DE-A-2341109, U.S. Pat. No. 3,821,195, DE-A-2715034 or DE-A-2134896, to a nucleophilic displacement reaction involving the cyanide ion CN$^\ominus$ as the nucleophile. In this reaction, the hal in the dye of the formula II, and any X=hal, is displaced by CN.

The solvent used for the displacement reaction is an inert organic solvent, for example nitrobenzene or glycol or diglycol monomethyl or monoethyl ether or a mixture thereof or with a tertiary organic nitrogen base, or a dipolar aprotic solvent, e.g. N-methylpyrrolidone, pyridine, dimethylformamide, dimethyl sulphoxide or a dicyanodialkyl thioether. Other suitable media for the displacement reaction are water and aqueous systems consisting of water and a water-immiscible organic solvent, for example nitrobenzene, preferably in the presence of a wetting or dispersing agent or in the presence of a known phase-transfer catalyst, or of water and a water-soluble, inert organic solvent, such as ethylene glycol or dimethylformamide.

The displacement reaction is also favourably affected by the presence of an organic, basic nitrogen compound, e.g. pyridine or a pyridine base.

The temperature for the displacement reaction is normally between 20° and 150° C.

The nucleophile CN$^\ominus$ is added to the reaction in the form of a simple or complex metal cyanide, e.g. an alkali metal or alkaline earth metal cyanide, zinc cyanide, alkali metal cyanozincate or alkali metal cyanoferrate, but preferably in the form of copper(I) cyanide or of a system which forms copper(I) cyanide. Of particular utility is the use of a combination of an alkali metal cyanide with copper(I) cyanide, in which the weight ratio of alkali metal and copper salt can be varied within wide limits.

The commonly used range for the weight ratio of alkali metal cyanide:copper(I) cyanide extends from 5:95 to 95:5. But even outside these limits it is still possible to detect a positive mutual influence between the components. It is of course also possible to replace the copper(I) cyanide in turn by a system which forms copper(I) cyanide, for example a combination of an alkali metal cyanide with another copper salt, preferably a copper(I) salt, for example a copper(I) halide.

The dyes of the formula II required for preparing the dyes according to the invention can be prepared by coupling a diazonium compound of an amine of the general formula III

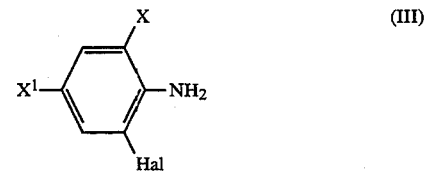

(III)

in a conventional manner with a coupling component of the general formula IV

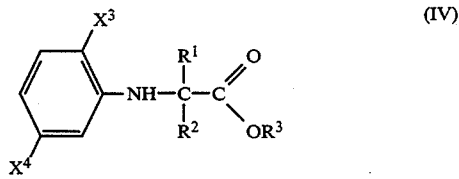

(IV)

where X, hal, X$^1$, X$^4$, X$^3$, R$^1$, R$^2$ and R$^3$ are each as defined above.

Amines of the general formula III are convertible into diazonium compounds in a conventional manner by the action of nitrous acid, or of some other system which forms nitrosonium ions, in a mineral acid or an aqueous mineral acid medium, a lower alkanoic acid, e.g. formic acid, acetic acid or propionic acid, or a mixture thereof, or an organic solvent at temperatures of −15° C. to 40° C.

Coupling is likewise carried out in a conventional manner by combining the resulting solution of the diazonium compound with a solution of coupling component at temperatures of 0° to 40° C., preferably 0° to 25° C., in a suitable solvent, for example an alkanol of 1 to 4 carbon atoms, dimethylformamide, preferably in water acidified with sulphuric acid, hydrochloric acid or phosphoric acid, or in an anhydrous or water-containing lower alkanoic acid or lower alkanoic acid mixture, in the presence or absence of an alkanol of limited water miscibility. In some cases it can be advantageous to buffer the pH during the coupling, for example by the addition of sodium acetate. Coupling is complete after a few hours, and the dye of the formula II can be isolated and dried in the usual manner.

The necessary compounds of the formulae III and IV are known or can be prepared from known commercial products by known methods.

A further method of preparing the dyes according to the invention comprises coupling a diazonium compound of an amine of the formula V

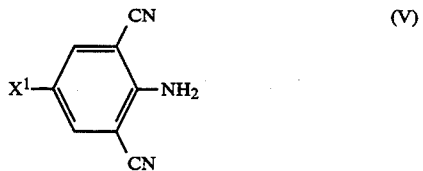

in a conventional manner with a coupling component of the formula IV

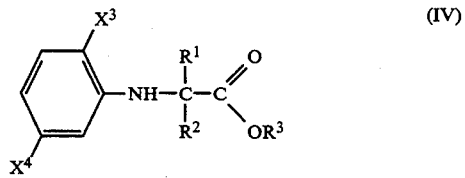

where $X^1$, $X^4$, $X^3$, $R^1$, $R^2$ and $R^3$ are each as defined above

Amines of the general formula V are convertible into the diazonium compounds in a conventional manner by the action of nitrous acid or of some other system which forms nitrosonium ions in a mineral acid or an aqueous mineral acid medium, a lower alkanoic acid, e.g. formic acid, acetic acid or propionic acid, or a mixture thereof, or an organic solvent at temperatures of −20° C. to 20° C.

Coupling is again carried out in a conventional manner by combining the resulting solution of the diazonium compound with the solution of the coupling component at temperatures of 0° to 40° C., preferably 0° to 25° C., in a suitable solvent, for example of alkanol of 1 to 4 carbon atoms, dimethylformamide, preferably in water acidified with sulphuric acid, hydrochloric acid or phosphoric acid, or an anhydrous or water-containing lower alkanoic acid or a lower alkanoic acid mixture, in the presence or absence of an alcohol of limited water miscibility. In some cases, it can be advantageous to buffer the pH during the coupling, for example by the addition of sodium acetate. The coupling is complete after a few hours, and the dye can be isolated and dried in the usual manner.

Dye mixtures according to the invention consist of two or more dyes of the formula I where $R^1$ to $R^3$ and $X^1$ to $X^4$ are each as defined above. Preference is given to mixtures of dyes of the formula I where $X^4$ and $X^3$ are present in the combinations $NHCOR^4/H$, $NHCOR^4/Cl$, $NHSO_2R^5/H$ and $NHSO_2R^5/Cl$, the individual components differing at least in the meaning of the radicals $R^4$ and $R^5$.

In the dye mixtures according to the invention, the ratio of the various dyes of the general formula I may vary within relatively wide limits. In general, the minimum proportion of component is 10% by weight and its maximum proportion is 90% by weight. In the case of dye mixtures which consist of only two dyes of the general formula I, preference is given to a weight ratio of 70:30 to 30:70, i.e. to a weight ratio where one dye accounts for 30 to 70% by weight.

The mixtures according to the invention can be prepared by mixing separately prepared and finished individual dye components. This mixing may take place in suitable mixers or moulds or else by stirring into the dyeing liquor. But it is preferable to finish the separately prepared individual dye components together, in which case the mixing in the preparation of dye powders can take place immediately prior to spray drying, while in the case of the mixing of dye powders and liquid dye preparations it can preferably take place prior to milling. Particular preference here is given to a conjoint thermal stabilization prior to grinding.

In a particularly preferred process, the dye mixtures according to the invention can be prepared by replacing the halogen in dye mixtures of at least two dyes of the general formula I for cyano in a conventional manner, for example as described above for individual dyes, and finishing the resulting mixture. The composition of the mixture of dyes of the general formula II here is chosen in such a way as to produce dye mixtures according to the invention.

The dyes and dye mixtures according to the invention are individually or mixed with other disperse dyes highly suitable for dyeing and printing hydrophobic synthetic materials. Hydrophobic synthetic materials which come into consideration are for example: cellulose acetate, cellulose triacetate, polyamides and high molecular weight polyesters. Preferably, the dyes according to the invention are used for dyeing and printing materials made of high molecular weight polyesters, in particular those based on polyethylene glycol terephthalates or mixtures thereof in natural fibre materials, or materials made of cellulose triacetate.

The hydrophobic synthetic materials can be present in the form of sheetlike or threadlike structures, having been processed for example into yarns of woven or knitted textile fabrics. The fibre material mentioned is dyed with the dyes or dye mixtures according to the invention in a conventional manner, preferably from an aqueous suspension in the presence or absence of carriers between 80° and about 110° C. by the exhaust method or in a dyeing autoclave at 110° to 140° C. by the HT method, or by the thermofix process, in which the fabric is padded with the dyeing liquor and then subjected to a dyeing fixing step at about 80° to 230° C. The printing of the materials mentioned can be carried in a conventional manner by incorporating the dyes or dye mixtures according to the invention into a print paste and treating the fabric printed therewith at temperatures between 80° and 230° C. in the presence or absence of a carrier with HT steam, high-pressure steam or dry heat to fix the dye. This produces very strong red dyeings and prints having very good fastness properties, in particular very good light fastness, fastness to dry heat treating and setting, thermal migration fastness and wash fastness and a low pH and reduction sensitivity. The very good hot light fastness is particularly noteworthy.

The dyes and dye mixtures according to the invention are also suitable for dyeing the aforementioned hydrophobic materials from organic solvents by the known solvent dyeing techniques, and for dyeing in the mass.

In the dyeing liquors and print pastes used in the above applications, the dyes and dye mixtures according to the invention should be present in a very finely divided form.

The dyes are finely divided in a conventional manner by slurrying the synthesized dye together with a dispersant in a liquid medium, preferably water, and subjecting the slurry to the action of shearing forces, and the dye particles originally present become mechanically reduced in size to such an extent as to maximize the specific surface area and minimize sedimentation of the dye. The particle sizes of the dyes are in general between 0.5 and 5 μm, preferably about 1 μm.

The dispersants used in the milling can be nonionic or anionic. Nonionic dispersants are for example reaction products of alkylene oxides, e.g. ethylene oxide or propylene oxide, with alkylatable compounds, for example fatty alcohols, fatty amines, fatty acids, phenols, alkylphenols and carboxamides. Anionic dispersants are for example ligninsulphonates, alkylsulphonates, alkylarylenesulphonates or alkylaryl polyglycol ether sulphates.

The dye preparations thus obtained should be pourable for most applications. For this reason the dye and dispersant content is limited in these cases. In general, the dispersions are standardized to a dye content of up to 50 percent by weight and a dispersant content of up to about 25%. For economic reasons, dye contents are usually not less than 15 percent by weight.

The dispersions may also contain further auxiliaries, for example auxiliaries which act as oxidizing agents, e.g. sodium m-nitrobenzenesulphonate, or fungicides, e.g. sodium o-phenylphenolate and sodium pentachlorophenolate.

The dye dispersions thus obtained can very advantageously be used for making up print pastes and dyeing liquors. They offer particular advantages for example in continuous processes, where the dye concentration of the dyeing liquor must be kept constant by a continuous feed of dye to the running apparatus.

For certain applications it is preferable to use pulverulent formulations. These powders contain the dye or dye mixture, a dispersant and other auxiliaries, for example wetting, oxidizing, preserving and dustproofing agents.

A preferred method of preparing pulverulent dye formulations comprises stripping the abovedescribed liquid dye dispersions of their liquid content, for example by vacuum drying, freeze drying or drum drying, but preferably by spray drying.

To prepare a dyeing liquor, the necessary amount of a dye formulation prepared as described above is diluted with the dyeing medium, preferably water, to such an extent as to produce a liquor ratio of 5:1 to 50:1 for the dyeing. In general, further dyeing auxiliaries, such as dispersants, wetting agents and fixing aids, are added to the liquor.

If the dye or dye mixture is to be used for textile printing, the necessary amount of dye formulation is kneaded together with a thickener, for example alkali metal alginate or the like, and possibly other additives, for example fixation accelerants, wetting agents and oxidizing agents, to form a print paste.

The invention is further illustrated by the Examples below. Percentages and parts are by weight.

EXAMPLE 1 a) To a suspension formed from 100 ml of dimethyl sulphoxide, 4.3 g of sodium cyanide and 14 g of copper(I) cyanide are added at 70° to 75° C. 66.1 g of the dye of the formula VI

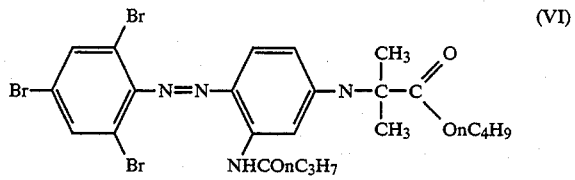

and the mixture is stirred at that temperature for 30 minutes. The temperature is then raised to 110° C. for 30 minutes, the batch is subsequently gradually cooled down by stirring and filtered with suction, and the filter residue is washed with 45 ml of dimethyl sulphoxide, 7.5% strength aqueous ammonia solution and water and dried under reduced pressure. This gives 47.3 g of a bluish red dye of the formula VII

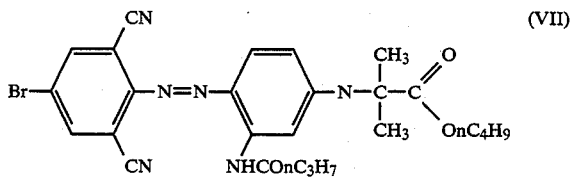

which has an absorption maximum at 528 μm and forms a clear bluish red solution in o-dichlorobenzene.

b) 30 parts of the dye of the formula VII and 70 parts of a ligninsulphonate dispersant are bead-milled in an aqueous medium to prepare a fine dye dispersion, which is dried by spray drying.

c) 1.2 g of the dye preparation thus obtained are dispersed in 2000 g of water. The dispersion is adjusted with acetic acid to pH 4–5 and admixed with 4 g of anhydrous sodium acetate and 2 g of a commercial dispersant based on a naphthalenesulphonic acid/formaldehyde condensate. The resulting dyeing liquor is entered with 100 g of a polyester fabric based on polyethylene glycol terephthalate for 30 minutes of dyeing at 130° C. Subsequent rinsing, reduction clearing with 0.2% strength aqueous sodium dithionite solution at 70° to 80° C. for 15 minutes, rinsing and drying leaves a strong red dyeing having very good coloristic properties, in particular very good fastness to dry heat pleating and setting and very good hot light fastness.

EXAMPLE 2 a) Example 1 is repeated, subjecting 61.7 g of the dye of the formula VIII

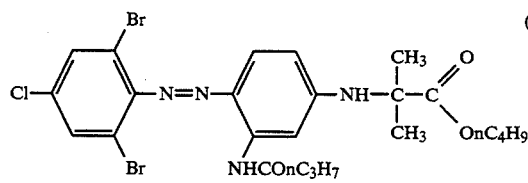

(VIII)

to replacement for cyano. 46 g are obtained of a bluish red dye of the formula IX

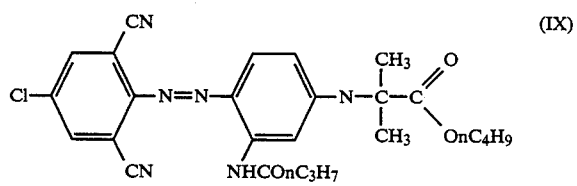

(IX)

which has an absorption maximum at 526 μm and gives a clear bluish red solution in o-dichlorobenzene.

b) 15.0 g of the dye thus obtained are incorporated in finely divided form in the print paste which contains 45.0 g of carob bean flour, 6.0 g of sodium 3-nitrobenzenesulphonate and 3.0 g of citric acid per 100 g. This print paste is used to print a polyester fabric which is then dried and thermosoled at 210° C. for 45 seconds, affording a strong bluish red print having excellent fastness properties, in particular good fastness to dry heat pleating and setting and an excellent hot light fastness.

The methods of Examples 1 and 2 can be used to prepare the novel dyes indicated in the tables below. They likewise dye hydrophobic fibres in full orange to violet shades having excellent fastness properties. The last columns of the tables below indicate the hues of the shades in terms of the follow abbreviations:

| | |
|---|---|
| orange | 1 |
| scarlet | 2 |
| red | 3 |
| bluish red | 4 |
| violet | 5 |

In the tables, branched radicals are indicated by i for iso, sec for secondary, etc., while cyclic radicals are indicated by cyclo. Radicals without such indications are normal, unbranched radicals.

TABLE 1

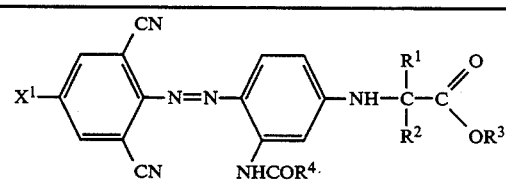

| $X^1$ | $R^4$ | $R^1$ | $R^2$ | $R^3$ | Hue on PES |
|---|---|---|---|---|---|
| Cl | $CH_3$ | $CH_3$ | $CH_3$ | $C_4H_9$ | 4 |
| Cl | $CH_3$ | $CH_3$ | $CH_3$ | $iC_3H_7$ | 4 |
| Cl | $CH_3$ | $CH_3$ | $CH_3$ | $iC_4H_9$ | 4 |
| Cl | $CH_3$ | $CH_3$ | $CH_3$ | $C_3H_7$ | 4 |
| Cl | $CH_3$ | $CH_3$ | $CH_3$ | $C_5H_{11}$ | 4 |
| Cl | $CH_3$ | $CH_3$ | $C_2H_5$ | $C_2H_5$ | 4 |
| Cl | $CH_3$ | $CH_3$ | $C_2H_5$ | $iC_3H_7$ | 4 |
| Cl | $CH_3$ | $CH_3$ | $C_3H_7$ | $C_3H_7$ | 4 |
| Cl | $CH_3$ | $C_2H_5$ | $C_2H_5$ | $C_4H_9$ | 4 |
| Cl | $CH_3$ | $C_2H_5$ | $C_4H_9$ | $CH_3$ | 4 |
| Cl | $CH_3$ | H | $iC_3H_7$ | $iC_5H_{11}$ | 4 |
| Cl | $CH_3$ | H | $C_2H_5$ | $(CH_2)_2OC_2H_5$ | 4 |
| Cl | $C_2H_5$ | $CH_3$ | $CH_3$ | $C_3H_7$ | 4 |
| Cl | $C_2H_5$ | $CH_3$ | $C_2H_5$ | $C_4H_9$ | 4 |
| Cl | $C_2H_5$ | $C_2H_5$ | $C_2H_5$ | $CH_2CH=CH_2$ | 4 |
| Cl | $C_2H_5$ | H | $C_3H_7$ | $iC_4H_9$ | 4 |
| Cl | $iC_3H_7$ | $CH_3$ | $CH_3$ | $C_2H_5$ | 4 |
| Cl | $iC_3H_7$ | $CH_3$ | $C_4H_9$ | $(CH_2)Cl$ | 4 |
| Cl | $iC_3H_7$ | $CH_3$ | $C_2H_5$ | $C_3H_7$ | 4 |
| Cl | $C_3H_7$ | $CH_3$ | $CH_3$ | $iC_3H_7$ | 4 |
| Cl | $C_3H_7$ | $CH_3$ | $CH_3$ | $iC_4H_9$ | 4 |
| Cl | $C_3H_7$ | $CH_3$ | $C_3H_7$ | $C_4H_9$ | 4 |
| Cl | $C_3H_7$ | $C_6H_{13}$ | H | $CH_3$ | 4 |
| Cl | $C_3H_7$ | $iC_3H_7$ | H | $(CH_2)_4OCH_3$ | 4 |
| Cl | $C_3H_7$ | $CH_3$ | $CH_3$ | $(CH_2)_2OC_2H_5$ | 4 |
| Cl | $C_3H_7$ | $CH_3$ | $CH_3$ | $(CH_2)_2C_6H_5$ | 4 |
| Cl | $C_3H_7$ | $CH_3$ | $C_2H_5$ | $C_3H_7$ | 4 |
| Cl | $C_4H_9$ | H | $C_2H_5$ | $C_4H_9$ | 4 |
| Cl | $C_4H_9$ | $CH_3$ | $CH_3$ | $iC_3H_7$ | 4 |
| Cl | $CH(CH_3)C_2H_5$ | $CH_3$ | $CH_3$ | $C_2H_5$ | 4 |
| Cl | $CH_2CH(CH_3)_2$ | H | $C_3H_7$ | $C_3H_7$ | 4 |
| Cl | $CH(CH_3)C_3H_7$ | $C_2H_5$ | $C_2H_5$ | $(CH_2)_2O(CH_2)_2OCH_3$ | 4 |
| Cl | $CH(C_2H_5)_2$ | $CH_3$ | $CH_3$ | $(CH_2)_2CN$ | 4 |
| Br | $CH_3$ | $CH_3$ | $CH_3$ | $C_2H_5$ | 4 |
| Br | $CH_3$ | $CH_3$ | $CH_3$ | $C_3H_7$ | 4 |
| Br | $CH_3$ | $CH_3$ | $CH_3$ | $iC_3H_7$ | 4 |
| Br | $CH_3$ | $CH_3$ | $CH_3$ | $C_4H_9$ | 4 |
| Br | $CH_3$ | $CH_3$ | $CH_3$ | $iC_4H_9$ | 4 |
| Br | $CH_3$ | $CH_3$ | $CH_3$ | $CH_2CH(C_2H_5)C_4H_9$ | 4 |
| Br | $CH_3$ | $CH_3$ | $CH_3$ | $CH_2C_6H_5$ | 4 |
| Br | $CH_3$ | $CH_3$ | $CH_3$ | $CH_2CH=CH_2$ | 4 |

TABLE 1-continued

Structure: X¹-substituted dicyanophenyl-azo-phenyl(NHCOR⁴)-NH-C(R¹)(R²)-C(=O)-OR³

| X¹ | R⁴ | R¹ | R² | R³ | Hue on PES |
|---|---|---|---|---|---|
| Br | CH₃ | CH₃ | CH₃ | (CH₂)₄O—COCH₃ | 4 |
| Br | CH₃ | CH₃ | C₂H₅ | CH₃ | 4 |
| Br | CH₃ | CH₃ | C₂H₅ | C₃H₇ | 4 |
| Br | CH₃ | CH₃ | C₃H₇ | iC₃H₇ | 4 |
| Br | CH₃ | C₂H₅ | C₂H₅ | C₂H₅ | 4 |
| Br | CH₃ | C₆H₁₃ | H | (CH₂)₂OC₆H₅ | 4 |
| Br | CH₃ | C₂H₅ | C₄H₉ | CH₂CH=CH—CH₃ | 4 |
| Br | C₂H₅ | CH₃ | CH₃ | C₄H₉ | 4 |
| Br | C₂H₅ | CH₃ | C₂H₅ | C₅H₁₁ | 4 |
| Br | iC₃H₇ | CH₃ | CH₃ | iC₃H₇ | 4 |
| Br | iC₃H₇ | CH₃ | CH₃ | (CH₂)₂Br | 4 |
| Br | iC₃H₇ | CH₃ | C₂H₅ | C₄H₉ | 4 |
| Br | C₃H₇ | CH₃ | CH₃ | iC₄H₉ | 4 |
| Br | C₃H₇ | CH₃ | CH₃ | C₆H₁₃ | 4 |
| Br | C₃H₇ | H | C₃H₇ | sec.C₄H₉ | 4 |
| Br | C₃H₇ | C₃H₇ | C₃H₇ | C₃H₇ | 4 |
| Br | C₃H₇ | CH₃ | CH₃ | CH₂CH(OH)CH₂OCH₃ | 4 |
| Br | C₃H₇ | H | C₂H₅ | cyclo-C₆H₁₁ | 4 |
| Br | C₃H₇ | CH₃ | CH₃ | C₃H₇ | 4 |
| Br | C₃H₇ | CH₃ | C₂H₅ | (CH₂)₄OC₃H₇ | 4 |
| Br | C₃H₇ | C₅H₁₁ | H | CH₂C₆H₅ | 4 |
| Sr | C₃H₇ | CH₃ | C₂H₅ | C₄H₉ | 4 |
| Br | C₃H₇ | C₂H₅ | C₂H₅ | iC₄H₉ | 4 |
| Br | C₃H₇ | C₂H₅ | C₂H₅ | (CH₂)₂OC₂H₅ | 4 |
| Br | C₃H₇ | CH₃ | C₄H₉ | C₂H₅ | 4 |
| Br | CH(CH₃)C₂H₅ | CH₃ | CH₃ | iC₃H₇ | 4 |
| Br | CH(C₂H₅)₂ | H | C₃H₇ | Tetrahydrofurfuryl | 4 |
| F | CH₃ | CH₃ | CH₃ | C₄H₉ | 3 |
| F | CH₃ | CH₃ | CH₃ | iC₃H₇ | 3 |
| F | CH₃ | CH₃ | C₂H₅ | C₂H₅ | 3 |
| F | C₂H₅ | CH₃ | CH₃ | iC₄H₉ | 3 |
| F | C₂H₅ | C₂H₅ | C₂H₅ | (CH₂)₂OCH₂CH=CH₂ | 3 |
| F | iC₃H₇ | CH₃ | C₂H₅ | CH₃ | 3 |
| F | iC₃H₇ | H | iC₃H₇ | (CH₂)₂COOC₂H₅ | 3 |
| F | iC₃H₇ | CH₃ | CH₃ | iC₅H₁₁ | 3 |
| F | C₃H₇ | CH₃ | CH₃ | iC₄H₉ | 3 |
| F | C₃H₇ | CH₃ | C₂H₅ | CH₂C₆H₅ | 3 |
| F | C₃H₇ | CH₃ | CH₃ | iC₆H₁₃ | 3 |
| F | C₃H₇ | H | C₃H₇ | (CH₂)₂C₆H₅ | 3 |
| F | CH(CH₃)C₂H₅ | CH₃ | CH₃ | C₂H₅ | 3 |
| F | CH(CH₃)C₃H₇ | H | C₂H₅ | C₄H₉ | 3 |
| CF₃ | CH₃ | C₂H₅ | C₂H₅ | CH₂CH=CH₂ | 5 |
| CF₃ | CH₃ | H | C₂H₅ | C₅H₁₁ | 5 |
| CF₃ | C₂H₅ | C₂H₅ | C₄H₉ | C₃H₇ | 5 |
| CF₃ | iC₃H₇ | CH₃ | CH₃ | (CH₂)₂OCOC₆H₅ | 5 |
| CF₃ | C₃H₇ | CH₃ | CH₃ | C₃H₇ | 5 |
| CF₃ | C₃H₇ | CH₃ | C₂H₅ | iC₃H₇ | 5 |
| OCH₃ | CH₃ | CH₃ | CH₃ | (CH₂)₂OcycloC₆H₁₁ | 2 |
| OCH₃ | C₂H₅ | CH₃ | CH₃ | C₅H₁₁ | 2 |
| OCH₃ | iC₃H₇ | CH₃ | iC₃H₇ | C₂H₅ | 2 |
| OCH₃ | C₃H₇ | CH₃ | CH₃ | (CH₂)₂OCOC₂H₅ | 2 |
| OC₂H₅ | C₃H₇ | C₂H₅ | C₂H₅ | CH₂C₆H₅ | 2 |
| OiC₃H₇ | CH₃ | CH₃ | CH₃ | (CH₂)₂COOCH₂CH=CH₂ | 2 |
| OC₄H₉ | iC₃H₇ | H | C₃H₇ | CH₃ | 2 |
| CH₃ | CH₃ | H | C₂H₅ | iC₄H₉ | 2 |
| CH₃ | CH₃ | CH₃ | CH₃ | iC₄H₉ | 2 |
| CH₃ | CH₃ | CH₃ | C₂H₅ | (CH₂)₂O(CH₂)₂OC₂H₅ | 2 |
| CH₃ | C₂H₅ | H | H | (CH₂)₂COOcycloC₆H₁₁ | 2 |
| CH₃ | C₃H₇ | CH₃ | CH₃ | C₄H₉ | 2 |
| CH₃ | C₃H₇ | CH₃ | CH₃ | iC₃H₇ | 2 |
| CH₃ | C₃H₇ | CH₃ | C₂H₅ | CH₂CH=CH₂ | 2 |
| CH₃ | C₃H₇ | C₂H₅ | C₂H₅ | C₃H₇ | 2 |
| CH₃ | CH(C₂H₅)₂ | CH₃ | CH₃ | C₂H₅ | 2 |
| CH₃ | C₂H₅ | H | iC₃H₇ | (CH₂)₂COOC₆H₅ | 2 |
| C₂H₅ | C₂H₅ | CH₃ | C₂H₅ | (CH₂)₄OCH₃ | 2 |
| iC₃H₇ | CH₃ | C₂H₅ | C₄H₉ | CH₃ | 2 |
| cycloC₆H₁₁ | iC₃H₇ | CH₃ | CH₃ | C₂H₅ | 2 |
| H | CH₃ | CH₃ | C₃H₇ | (CH₂)₂C₆H₅ | 3 |
| H | C₃H₇ | CH₃ | CH₃ | (CH₂)₄OC₆H₅ | 3 |
| H | C₃H₇ | C₂H₅ | C₂H₅ | C₃H₇ | 3 |

TABLE 1-continued

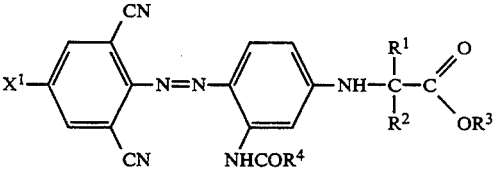

| X¹ | R⁴ | R¹ | R² | R³ | Hue on PES |
|---|---|---|---|---|---|
| H | $C_2H_5$ | $CH_3$ | $C_3H_7$ | $C_4H_9$ | 3 |

TABLE 2

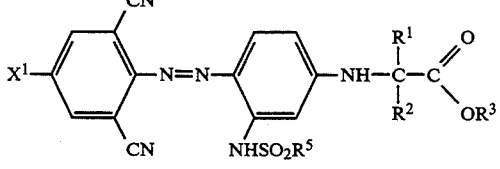

| X¹ | R⁵ | R¹ | R² | R³ | Hue on PES |
|---|---|---|---|---|---|
| Cl | $CH_3$ | $CH_3$ | $CH_3$ | $C_4H_9$ | 3 |
| Cl | $CH_3$ | $CH_3$ | $C_2H_5$ | $iC_4H_9$ | 3 |
| Cl | $C_2H_5$ | H | $C_3H_7$ | $C_2H_5$ | 3 |
| Cl | $C_2H_5$ | $CH_3$ | $CH_3$ | $CH_2CH=CH_2$ | 3 |
| Cl | $C_3H_7$ | $CH_3$ | $CH_3$ | $C_3H_7$ | 3 |
| Cl | $iC_3H_7$ | $CH_3$ | $C_4H_9$ | $(CH_2)_4OiC_3H_7$ | 3 |
| Cl | $C_4H_9$ | $CH_3$ | $CH_3$ | $(CH_2)_3C_6H_5$ | 3 |
| Cl | $C_4H_9$ | H | $CH_3$ | $(CH_2)_4OC_6H_5$ | 3 |
| Cl | $C_6H_{13}$ | $CH_3$ | $CH_3$ | $C_2H_5$ | 3 |
| Br | $CH_3$ | $CH_3$ | $CH_3$ | $C_3H_7$ | 3 |
| Br | $CH_3$ | $CH_3$ | $C_2H_5$ | $iC_3H_7$ | 3 |
| Br | $C_2H_5$ | H | $iC_3H_7$ | $CH_2CH=CHCH_3$ | 3 |
| Br | $C_3H_7$ | $CH_3$ | $CH_3$ | $(CH_2)_2CN$ | 3 |
| Br | $C_3H_7$ | $CH_3$ | $CH_3$ | $C_2H_5$ | 3 |
| Br | $C_4H_9$ | $CH_3$ | $CH_3$ | $C_4H_9$ | 3 |
| Br | $iC_4H_9$ | $CH_3$ | $C_3H_7$ | $CH_3$ | 3 |
| F | $CH_3$ | $CH_3$ | $C_2H_5$ | $iC_4H_9$ | 1–2 |
| F | $C_2H_5$ | $CH_3$ | $CH_3$ | $C_2H_5$ | 1–2 |
| F | $C_2H_5$ | $CH_3$ | $CH_3$ | $(CH_2)_2Cl$ | 1–2 |
| F | $C_6H_{13}$ | $CH_3$ | $CH_3$ | $(CH_2)_4O$—$COC_2H_5$ | 1–2 |
| $CF_3$ | $CH_3$ | $CH_3$ | $C_2H_5$ | $(CH_2)_4OC_2H_5$ | 4 |
| $CF_3$ | $C_2H_5$ | $CH_3$ | $CH_3$ | $C_5H_{11}$ | 4 |
| $OCH_3$ | $C_2H_5$ | $CH_3$ | $C_2H_5$ | $C_2H_5$ | 1 |
| $OCH_3$ | $iC_3H_7$ | H | $C_4H_9$ | Tetrahydrofurfuryl | 1 |
| $OC_3H_7$ | $C_4H_9$ | $CH_3$ | $CH_3$ | $CH_3$ | 1 |
| $CH_3$ | $CH_3$ | $C_2H_5$ | $C_2H_5$ | $C_2H_5$ | 1 |
| $CH_3$ | $C_3H_7$ | $CH_3$ | $CH_3$ | $CH_2CH=CH_2$ | 1 |
| $CH_3$ | $iC_4H_9$ | H | $C_3H_7$ | $C_2H_5$ | 1 |
| $CH_3$ | $C_4H_9$ | $CH_3$ | $C_2H_5$ | $(CH_2)_4CN$ | 1 |
| $CH_3$ | $iC_8H_{17}$ | $CH_3$ | $CH_3$ | $(CH_2)_2O(CH_2)_2C_6H_5$ | 1 |
| $C_3H_7$ | $CH_3$ | $CH_3$ | $CH_3$ | $C_4H_9$ | 1 |
| H | $C_2H_5$ | H | $C_2H_5$ | $iC_4H_9$ | 1 |

TABLE 3

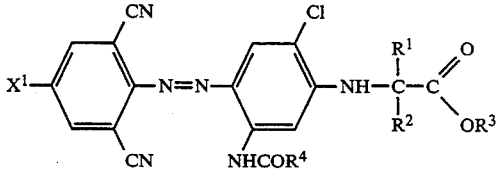

| X¹ | R⁴ | R¹ | R² | R³ | Hue on PES |
|---|---|---|---|---|---|
| Cl | $CH_3$ | $CH_3$ | $CH_3$ | $iC_5H_{11}$ | 4 |
| Cl | $CH_3$ | H | $C_2H_5$ | $sec.C_6H_{13}$ | 4 |
| Cl | $C_2H_5$ | $CH_3$ | $C_2H_5$ | $C_3H_7$ | 4 |
| Cl | $C_3H_7$ | $CH_3$ | $CH_3$ | $C_4H_9$ | 4 |
| Cl | $C_3H_7$ | H | $C_4H_9$ | $CH_2C_6H_5$ | 4 |
| Cl | $C_3H_7$ | $CH_3$ | $C_3H_7$ | $(CH_2)_2OC_3H_7$ | 4 |
| Br | $CH_3$ | H | $iC_3H_7$ | $(CH_2)_2OC_6H_5$ | 5 |
| Br | $CH_3$ | $CH_3$ | $CH_3$ | $C_4H_9$ | 5 |
| Br | $C_2H_5$ | $CH_3$ | $CH_3$ | $C_3H_7$ | 5 |
| Br | $iC_3H_7$ | $CH_3$ | $C_2H_5$ | $iC_3H_7$ | 5 |
| Br | $C_3H_7$ | H | $C_2H_5$ | $iC_4H_9$ | 5 |
| Br | $C_3H_7$ | $CH_3$ | $CH_3$ | $iC_4H_9$ | 5 |
| F | $CH_3$ | $CH_3$ | $C_4H_9$ | $C_2H_5$ | 3 |
| F | $iC_3H_7$ | $CH_3$ | $CH_3$ | $CH_2CH=CH_2$ | 3 |
| F | $C_3H_7$ | $CH_3$ | $CH_3$ | $(CH_2)_3COOiC_3H_7$ | 3 |
| F | $C_4H_9$ | H | $CH_3$ | $CH_3$ | 3 |
| F | $iC_8H_{17}$ | $CH_3$ | $CH_3$ | $(CH_2)_4OH$ | 3 |
| $CF_3$ | $C_2H_5$ | $CH_3$ | $C_2H_5$ | $C_2H_5$ | 5 |
| $CF_3$ | $C_2H_5$ | $CH_3$ | $C_3H_7$ | $(CH_2)_2Cl$ | 5 |
| $OCH_3$ | $CH_3$ | H | $C_3H_7$ | $cycloC_5H_9$ | 2 |
| $OCH_3$ | $C_2H_5$ | $CH_3$ | $CH_3$ | $CH_2C_6H_5$ | 2 |
| $OC_4H_9$ | $C_2H_5$ | $CH_3$ | $CH_3$ | $C_2H_5$ | 2 |
| $CH_3$ | $CH_3$ | $CH_3$ | $C_3H_7$ | $C_2H_5$ | 2 |
| $CH_3$ | $C_2H_5$ | H | $C_4H_9$ | $(CH_2)_3C_6H_5$ | 2 |
| $CH_3$ | $C_2H_5$ | $C_2H_5$ | $C_2H_5$ | $C_4H_9$ | 2 |
| $CH_3$ | $C_3H_7$ | H | $iC_3H_7$ | $(CH_2)_2OC_6H_5$ | 2 |
| $CH_3$ | $C_3H_7$ | $CH_3$ | $C_2H_5$ | $C_3H_7$ | 2 |
| $C_3H_7$ | $CH_3$ | $C_2H_5$ | $C_3H_7$ | $CH_3$ | 2 |
| H | $iC_3H_7$ | H | $sec.C_6H_{13}$ | $(CH_2)_3COOC_2H_5$ | 2 |

TABLE 4

| X¹ | X⁴ | R¹ | R² | R³ | Hue on PES |
|---|---|---|---|---|---|
| Cl | $OCH_3$ | $CH_3$ | $CH_3$ | $C_3H_7$ | 3 |
| Cl | $OCH_3$ | $CH_3$ | $CH_3$ | $C_4H_9$ | 3 |
| Cl | $OCH_3$ | $CH_3$ | $C_2H_5$ | $iC_5H_{11}$ | 3 |
| Cl | $OC_2H_5$ | H | $C_3H_7$ | $(CH_2)_2O$—$Co$-$(4$-$Cl$-$C_6H_5)$ | 3 |
| Br | $OCH_3$ | $CH_3$ | $CH_3$ | $iC_4H_9$ | 3 |
| Br | $OCH_3$ | $CH_3$ | $CH_3$ | $CH_2C_6H_5$ | 3 |
| Br | $OCH_3$ | $CH_3$ | $C_2H_5$ | $CH_2CH=CH_2$ | 3 |
| Br | $OC_3H_7$ | H | $C_3H_7$ | $sec.C_4H_9$ | 3 |

TABLE 4-continued

Structure: 2,6-dicyano-4-X¹-phenyl-azo-[3-X⁴-4-(NH-CR¹R²-COOR³)-phenyl]

| X¹ | X⁴ | R¹ | R² | R³ | Hue on PES |
|---|---|---|---|---|---|
| F | OCH₃ | CH₃ | CH₃ | C₅H₁₁ | 2 |
| F | OCH₃ | C₂H₅ | C₂H₅ | C₂H₅ | 2 |
| F | OC₄H₉ | H | C₂H₅ | iC₄H₉ | 2 |
| CF₃ | OCH₃ | CH₃ | CH₃ | C₄H₉ | 4 |
| CF₃ | OCH₃ | CH₃ | C₂H₅ | (CH₂)₄OC₃H₇ | 4 |
| OCH₃ | OCH₃ | CH₃ | CH₃ | C₃H₇ | 1-2 |
| OCH₃ | OCH₃ | CH₃ | CH₃ | CH₂C₆H₅ | 1-2 |
| OiC₄H₉ | OCH₃ | H | CH₃ | CH₃ | 1-2 |
| CH₃ | OCH₃ | CH₃ | CH₃ | (CH₂)₄OH | 1-2 |
| CH₃ | OiC₄H₉ | H | C₂H₅ | (CH₂)₂O(CH₂)OC₄H₉ | 1-2 |
| CH₃ | OCH₃ | CH₃ | CH₃ | C₃H₇ | 1-2 |
| CH₃ | OC₂H₅ | CH₃ | C₃H₇ | C₄H₉ | 1-2 |
| cycloC₅H₉ | OCH₃ | H | C₃H₇ | (CH₂)₄OCH₃ | 1-2 |

TABLE 5

Structure: 2,6-dicyano-4-X¹-phenyl-azo-[3-methyl-4-(NH-CR¹R²-COOR³)-phenyl]

| X¹ | R¹ | R² | R³ | Hue on PES |
|---|---|---|---|---|
| Cl | CH₃ | CH₃ | C₂H₅ | 3 |
| Cl | CH₃ | CH₃ | C₃H₇ | 3 |
| Cl | CH₃ | CH₃ | C₄H₉ | 3 |
| Cl | CH₃ | CH₃ | CH₂CH=CH₂ | 3 |
| Cl | CH₃ | C₂H₅ | CH₂C₆H₅ | 3 |
| Cl | CH₃ | C₂H₅ | iC₄H₉ | 3 |
| Cl | C₂H₅ | C₂H₅ | C₃H₇ | 3 |
| Cl | CH₃ | C₃H₇ | (CH₂)₄OC₃H₇ | 3 |
| Cl | C₂H₅ | C₂H₅ | C₂H₅ | 3 |
| Cl | CH₃ | CH₃ | (CH₂)₂CN | 3 |
| Cl | R | C₃H₇ | (CH)₄OC₆H₅ | 3 |
| Br | CH₃ | CH₃ | (CH₂)₄CN | 3-4 |
| Br | CH₃ | CH₃N | iC₄H₉ | 3-4 |
| Br | CH₃ | CH₃ | iC₃H₇ | 3-4 |
| Br | CH₃ | CH₃ | C₄H₉ | 3-4 |
| Br | H | C₄H₉ | CH₂C₆H₅ | 3-4 |
| Br | CH₃ | C₂H₅ | (CH₂)₃CN | 3-4 |
| Br | CH₃ | C₄H₉ | C₂H₅ | 3-4 |
| Br | C₂H₅ | C₂H₅ | C₃H₇ | 3-4 |
| Br | C₂H₅ | C₂H₅ | (CH₂)₂COOC₃H₇ | 3-4 |
| Br | C₂H₅ | C₂H₅ | CH₃ | 3-4 |
| Br | H | C₄H₉ | (CH₂)₃C₆H₅ | 3-4 |
| F | CH₃ | CH₃ | C₄H₉ | 2-3 |
| F | CH₃ | CH₃ | iC₃H₇ | 2-3 |
| F | C₂H₅ | C₂H₅ | iC₄H₉ | 2-3 |
| F | H | CH₃ | C₆H₁₃ | 2-3 |
| F | C₂H₅ | C₄H₉ | (CH₂)₂OC₄H₉ | 2-3 |
| CF₃ | CH₃ | CH₃ | C₃H₇ | 4-5 |
| CF₃ | CH₃ | CH₃ | iC₈H₁₇ | 4-5 |
| CF₃ | CH₃ | C₂H₅ | (CH₂)₄Cl | 4-5 |
| CF₃ | CH₃ | C₂H₅ | C₄H₉ | 4-5 |
| OCH₃ | CH₃ | CH₃ | CH₂CH(OH)CH₂OC₂H₅ | 1-2 |
| OCH₃ | C₂H₅ | C₂H₅ | C₃H₇ | 1-2 |
| O(CH₂)₂OCH₃ | CH₃ | CH₃ | CH₂CH=CH₂ | 1-2 |
| CH₃ | CH₃ | CH₃ | ((CH₂)₂O)₃CH₃ | 1-2 |
| CH₃ | CH₃ | CH₃ | C₄H₉ | 1-2 |
| CH₃ | CH₃ | CH₃ | iC₄H₉ | 1-2 |
| CH₃ | C₆H₁₃ | H | (CH₂)₃CN | 1-2 |
| CH₃ | CH₃ | C₂H₅ | C₂H₅ | 1-2 |
| H | C₂H₅ | C₂H₅ | C₃H₇ | 2 |

TABLE 6

Structure: 2,6-dicyano-4-X¹-phenyl-azo-[4-(NH-CR¹R²-COOR³)-phenyl]

| X¹ | R¹ | R² | R³ | Hue on PES |
|---|---|---|---|---|
| Cl | CH₃ | CH₃ | C₃H₇ | 2 |
| Cl | CH₃ | CH₃ | C₄H₉ | 2 |
| Cl | CH₃ | CH₃ | iC₅H₁₁ | 2 |
| Cl | CH₃ | CH₃ | CH₂CH=CH₂ | 2 |
| Cl | CH₃ | C₂H₅ | iC₄H₉ | 2 |
| Cl | C₂H₅ | C₂H₅ | (CH₂)₃COOC₂H₅ | 2 |
| Cl | CH₃ | C₂H₅ | C₂H₅ | 2 |
| Cl | CH₃ | C₃H₇ | (CH₂)₄OC₂H₅ | 2 |
| Cl | H | C₂H₅ | (CH₂)₂C₆H₅ | 2 |
| Cl | H | C₃H₇ | (CH₂)₄OC₆H₅ | 2 |
| Br | CH₃ | CH₃ | iC₃H₇ | 2-3 |
| Br | CH₃ | CH₃ | C₄H₉ | 2-3 |
| Br | CH₃ | CH₃ | C₅H₁₁ | 2-3 |
| Br | CH₃ | CH₃ | CH₂CH=CH₂ | 2-3 |
| Br | CH₃ | C₂H₅ | C₃H₇ | 2-3 |
| Br | CH₃ | C₂H₅ | iC₄H₉ | 2-3 |
| Br | C₂H₅ | C₂H₅ | C₂H₅ | 2-3 |
| Br | C₂H₅ | C₂H₅ | (CH₂)₄Br | 2-3 |
| Br | CH₃ | C₄H₉ | (CH₂)₄On-C₄H₉ | 2-3 |
| Br | H | iC₃H₇ | (CH₂)₃C₆H₅ | 2-3 |
| F | CH₃ | CH₃ | iC₃H₇ | 1-2 |
| F | CH₃ | CH₃ | C₄H₉ | 1-2 |
| F | CH₃ | C₂H₅ | C₂H₅ | 1-2 |
| F | H | C₃H₇ | C₆H₁₃ | 1-2 |
| F | H | C₄H₉ | CH₂C₆H₅ | 1-2 |
| CF₃ | CH₃ | CH₃ | C₃H₇ | 3 |
| CF₃ | CH₃ | C₂H₅ | (CH₂)₃CN | 3 |
| CF₃ | CH₃ | C₃H₇ | CH₃ | 3 |
| OCH₃ | CH₃ | CH₃ | C₄H₉ | 1-2 |
| OCH₃ | CH₃ | CH₃ | CH₂CH=CH₂ | 1-2 |
| O(CH₂)₂OC₂H₅ | H | CH₃ | (CH₂)₄OCH₃ | 1-2 |
| CH₃ | CH₃ | CH₃ | iC₃H₇ | 1-2 |
| CH₃ | CH₃ | C₂H₅ | C₂H₅ | 1-2 |
| CH₃ | H | C₃H₇ | C₄H₉ | 1-2 |

TABLE 7

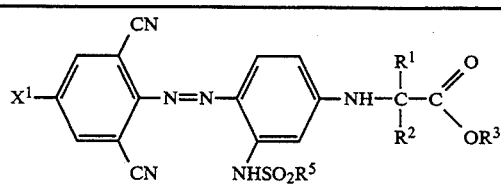

| X¹ | R⁵ | R¹ | R² | R³ | Hue on PES |
|---|---|---|---|---|---|
| Cl | CH₃ | CH₃ | C₂H₅ | C₄H₉ | 3 |
| Cl | C₂H₅ | CH₃ | CH₃ | iC₄H₉ | 3 |
| Cl | C₄H₉ | H | C₂H₅ | sec.C₅H₁₁ | 3 |
| Br | CH₃ | C₂H₅ | C₂H₅ | C₂H₅ | 3–4 |
| Br | iC₃H₇ | CH₃ | CH₃ | (CH₂)₄COOC₆H₅ | 3–4 |
| Br | C₃H₇ | CH₃ | CH₃ | C₃H₇ | 3–4 |
| F | CH₃ | CH₃ | n-C₄H₉ | (CH₂)₂CN | 2 |
| CF₃ | C₂H₅ | CH₃ | C₂H₅ | iC₃H₇ | 4 |
| CF 3 | C₅H₁₁ | H | C₃H₇ | C₆H₁₃ | 4 |
| OCH₃ | iC₃H₇ | CH₃ | CH₃ | (CH₂)₂OC₄H₉ | 1–2 |
| O(CH₂)₄OH | CH₃ | CH₃ | CH₃ | CH₃ | 1–2 |
| CH₃ | C₂H₅ | CH₃ | C₃H₇ | C₄H₉ | 1–2 |
| H | C₂H₅ | CH₃ | C₂H₅ | C₂H₅ | 1–2 |

TABLE 8

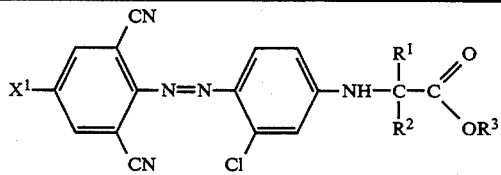

| X¹ | R¹ | R² | R³ | Hue on PES |
|---|---|---|---|---|
| Cl | CH₃ | CH₃ | C₂H₅ | 2 |
| Cl | CH₃ | C₂H₅ | (CH₂)₄Cl | 2 |
| Cl | H | C₅H₁₁ | sec.C₄H₉ | 2 |
| Br | CH₃ | CH₃ | C₄H₉ | 2 |
| Br | C₂H₅ | C₂H₅ | (CH₂)₄O—CO(4—CH₃—C₆H₅) | 2 |
| Br | CH₃ | C₄H₉ | iC₃H₇ | 2 |
| F | CH₃ | CH₃ | (CH₂O)₃OC₄H₉ | 1–2 |
| CF₃ | CH₃ | CH | C₃H₇ | 2–3 |
| CF₃ | H | C₂H₅ | (CH₂)₃COOCH₂CH=CH₂ | 2–3 |
| OCH₃ | CH₃ | CH₃ | iC₄H₉ | 1 |
| CH₃ | C₂H₅ | C₄H₉ | C₂H₅ | 1 |
| CH₃ | CH₃ | CH₃ | (CH₂)₂OC₆H₅ | 1 |
| H | H | iC₃H₇ | C₆H₁₃ | 1 |

TABLE 9

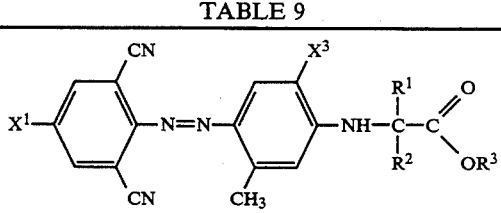

| X¹ | X³ | R¹ | R² | R³ | Hue on PES |
|---|---|---|---|---|---|
| Cl | OCH₃ | CH₃ | CH₃ | C₃H₇ | 4–5 |
| Cl | OCH₃ | CH₃ | CH₃ | C₅H₁₁ | 4–5 |
| Cl | OCH₃ | CH₃ | C₂H₅ | iC₃H₇ | 4–5 |
| Cl | OC₂H₅ | C₅H₁₁ | H | CH₃ | 4–5 |
| Br | OCH₃ | CH₃ | CH₃ | (CH₂)₄OCH₂CH=CH₂ | 4–5 |
| Br | OCH₃ | CH₃ | CH₃ | C₄H₉ | 4–5 |
| Br | OCH₃ | C₂H₅ | C₂H₅ | (CH₂)₂OcycloC₅H₉ | 4–5 |
| Br | OC₃H₇ | H | C₂H₅ | (CH₂)₃CN | 4–5 |
| F | OCH₃ | CH₃ | CH₃ | (CH₂)₂Br | 3–4 |
| F | OCH₃ | CH₃ | C₂H₅ | C₃H₇ | 3–4 |
| F | OC₂H₅ | CH₃ | CH₃ | CH₂CH=CH₂ | 3–4 |
| CF₃ | OCH₃ | CH₃ | CH₃ | CH₂C₆H₅ | 5 |
| OCH₃ | OCH₃ | CH₃ | C₂H₅ | C₅H₁₁ | 2–3 |

TABLE 9-continued

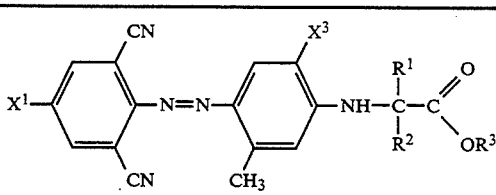

| X¹ | X³ | R¹ | R² | R³ | Hue on PES |
|---|---|---|---|---|---|
| CH₃ | OCH₃ | CH₃ | CH₃ | C₃H₇ | 2–3 |
| CN3 | OCH₃ | CH₃ | C₃H₇ | (CH₂)₄OH | 2–3 |
| CH₃ | OC₂H₅ | H | C₂H₅ | (CH₂)₃C₆H₅ | 2–3 |
| C₃H₇ | OCH₃ | H | C₄H₉ | CycloC₆H₁₁ | 2–3 |
| Cl | CH₃ | CH₃ | CH₃ | C₄H₉ | 3–4 |
| Cl | CH₃ | CH₃ | CH₃ | iC₃H₇ | 3–4 |
| Br | CH₃ | CH₃ | CH₃ | (CH₂)₂COOC₆H₅ | 3–4 |
| Br | CH₃ | CH₃ | C₂H₅ | C₂H₅ | 3–4 |

TABLE 10

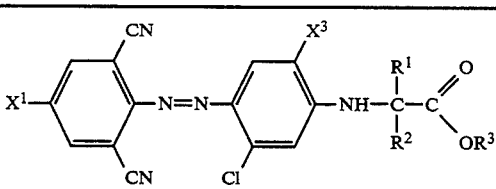

| X¹ | X³ | R¹ | R² | R³ | Hue on PES |
|---|---|---|---|---|---|
| Cl | OCH₃ | CH₃ | CH₃ | C₄H₉ | 3 |
| Cl | OCH₃ | CH₃ | C₂H₅ | C₃H₇ | 3 |
| Cl | OCH₃ | H | nC₄H₉ | (CH₂)₂C₆H₅ | 3 |
| Br | OCH₃ | CH₃ | CH₃ | iC₄H₉ | 3 |
| Br | OCH₃ | C₂H₅ | C₂H₅ | (CH₂)₄OCH₃ | 3 |
| Br | OCH₃ | CH₃ | C₂H₅ | (CH₂)₂O—COiC₃H₇ | 3 |
| Br | OCH₃ | CH₃ | CH₃ | iC₅H₁₁ | 3 |
| F | OCH₃ | CH₃ | CH₃ | C₂H₅ | 2 |
| CF₃ | OCH₃ | CH₃ | CH₃ | (CH₂)₂Cl | 4 |
| OCH₃ | OCH₃ | H | iC₃H₇ | CH₃ | 1–2 |
| CH₃ | OCH₃ | C₄H₉ | C₄H₉ | (CH₂)₃CN | 1–2 |
| CH₃ | OCH₃ | C₂H₅ | C₂H₅ | C₅H₁₁ | 1–2 |
| Cl | CH₃ | CH₃ | CH₃ | iC₈H₁₇ | 2–3 |
| Br | CH₃ | CH₃ | CH₃ | iC₃H₇ | 2–3 |
| F | CH₃ | CH₃ | CH₃ | iC₃H₇ | 2 |

TABLE 11

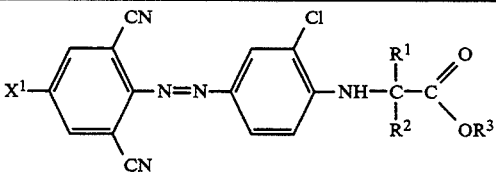

| X¹ | R¹ | R² | R³ | Hue on PES |
|---|---|---|---|---|
| Cl | CH₃ | CH₃ | iC₄H₉ | 1–2 |
| Cl | H | C₃H₇ | iC₃H₇ | 1–2 |
| Cl | H | iC₃H₇ | (CH₂)₃O—COCH₃ | 1–2 |
| Br | CH₃ | C₂H₅ | C₃H₇ | 1–2 |
| Br | H | CH₃ | (CH₂)₂C₆H₅ | 1–2 |
| Br | CH₃ | CH₃ | CH₂CH=CH₂ | 1–2 |
| F | H | C₂H₅ | (CH₂)₄OC₆H₅ | 1 |
| CF₃ | CH₃ | CH₃ | (CH₂)₃OC₂H₅ | 2–3 |
| CF₃ | H | C₂H₅ | cycloC₅H₉ | 2–3 |
| OCH₃ | CH₃ | CH₃ | C₄H₉ | 1 |
| CH₃ | H | C₄H₉ | (CH₂)₂CN | 1 |
| H | H | C₂H₅ | C₂H₅ | 1 |

TABLE 12

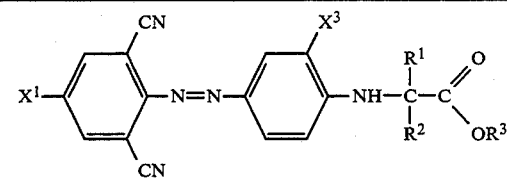

| X¹ | X³ | R¹ | R² | R³ | Hue on PES |
|---|---|---|---|---|---|
| Cl | OCH₃ | CH₃ | CH₃ | C₂H₅ | 2 |
| Cl | OC₂H₅ | CH₃ | CH₃ | iC₃H₇ | 2 |
| Br | OCH₃ | CH₃ | C₂H₅ | (CH₂)₃O—COC₂H₅ | 2 |
| Br | OCH₃ | H | C₆H₁₃ | (CH₂)₂C₆H₅ | 2 |
| F | OCH₃ | CH₃ | C₃H₇ | C₄H₉ | 1–2 |
| F | OiC₃H₇ | H | C₄H₉ | C₂H₅ | 1–2 |
| CF₃ | OCH₃ | H | C₂H₅ | (CH₂)₄CN | 3 |
| OCH₃ | OCH₃ | CH₃ | CH₃ | C₃H₇ | 1 |
| CH₃ | OC₂H₅ | H | CH₃ | C₆H₁₃ | 1 |

TABLE 14

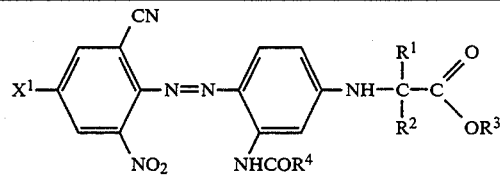

| X¹ | R⁴ | R¹ | R² | R³ | Hue on PES |
|---|---|---|---|---|---|
| Cl | CH₃ | CH₃ | CH₃ | C₄H₉ | 4 |
| Cl | C₃H₇ | CH₃ | CH₃ | C₄H₉ | 4 |
| Cl | iC₃H₇ | CH₃ | CH₃ | C₃H₇ | 4 |
| Cl | C₃H₇ | CH₃ | C₂H₅ | iC₃H₇ | 4 |
| Br | C₃H₇ | C₂H₅ | C₂H₅ | (CH₂)₂OC₂H₅ | 4 |
| Br | C₃H₇ | CH₃ | CH₃ | CH₂C₆H₅ | 4 |
| Br | iC₃H₇ | H | C₂H₅ | iC₄H₉ | 4 |
| F | CH₃ | CH₃ | CH₃ | C₅H₉ | 3 |
| F | C₃H₇ | C₂H₅ | C₄H₉ | C₂H₅ | 3 |
| CF₃ | C₂H₅ | CH₃ | CH₃ | C₄H₉ | 5 |
| OCH₃ | CH₃ | H | CH₃ | CH₂CH=CH₂ | 2 |
| CH₃ | C₂H₅ | CH₃ | C₃H₇ | (CH₂)₄OCH₃ | 2 |

TABLE 13

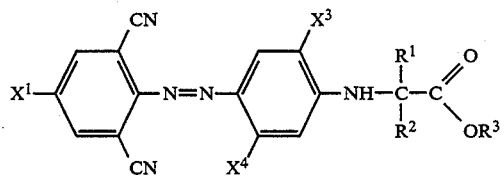

| X¹ | X⁴ | X³ | R¹ | R² | R³ | Hue on PES |
|---|---|---|---|---|---|---|
| Cl | OCH₃ | OCH₃ | CH₃ | CH₃ | (CH₂)₃CN | 5 |
| Cl | OCH₃ | OCH₃ | H | C₂H₅ | sec.C₅H₁₁ | 5 |
| Cl | OC₂H₅ | OC₂H₅ | H | C₃H₇ | C₄H₉ | 5 |
| Br | OCH₃ | OCH₃ | CH₃ | CH₃ | C₃H₇ | 5 |
| Br | OCH₃ | OCH₃ | CH₃ | C₂H₅ | (CH₂)₄OH | 5 |
| F | OCH₃ | OCH₃ | C₂H₅ | C₂H₅ | (CH₂)₂Cl | 4 |
| F | OCH₃ | OCH₃ | CH₃ | CH₃ | (CH₂)₄OC₂H₅ | 4 |
| F | OC₂H₅ | OC₂H₅ | H | C₂H₅ | (CH₂)₃C₆H₅ | 4 |
| CF₃ | OCH₃ | OCH₃ | CH₃ | CH₃ | C₃H₇ | 5 |
| OCH₃ | OCH₃ | OCH₃ | CH₃ | CH₃ | C₂H₅ | 3 |
| CH₃ | OCH₃ | OCH₃ | CH₃ | CH₃ | C₂H₅ | 3 |
| CH₃ | OC₃H₇ | OC₃H₇ | H | C₄H₉ | CH₂C₆H₅ | 3 |
| CH₃ | OCH₃ | OCH₃ | CH₃ | CH₃ | C₄H₉ | 3 |
| C₂H₅ | OCH₃ | OCH₃ | CH₃ | C₂H₅ | C₆H₁₃ | 3 |
| Cl | H | CH₃ | CH₃ | CH₃ | (CH₂)₃COOC₂H₅ | 2 |
| Br | H | CH₃ | H | C₃H₇ | Tetrahydrofurfuryl | 2 |
| Br | H | CH₃ | CH₃ | CH₃ | (CH₂)₂CN | 2 |
| F | H | CH₃ | C₅H₁₁ | H | iC₃H₇ | 1–2 |
| CF₃ | H | CH₃ | CH₃ | C₂H₅ | C₂H₅ | 3 |
| CH₃ | H | CH₃ | H | C₂H₅ | C₆H₅ | 1 |
| Cl | NHCOCH₃ | CH₃ | H | C₄H₉ | sec.C₅H₁₁ | 5 |
| Br | NHCOCH₃ | CH₃ | CH₃ | CH₃ | C₃H₇ | 5 |
| Br | NHCOC₂H₅ | CH₃ | CH₃ | CH₃ | C₄H₉ | 5 |
| F | NHCOC₃H₇ | CH₃ | C₆H₁₃ | H | (CH₂)₃OCH₃ | 4 |
| Cl | NHSO₂CH₃ | CH₃ | CH₃ | CH₃ | C₄H₉ | 4 |
| Br | NHSO₂CH₃ | CH₃ | C₂H₅ | C₂H₅ | (CH₂)₃COOCH₂CH=CH₂ | 4 |
| F | NHSO₂C₂H₅ | CH₃ | H | C₃H₇ | C₆H₅ | 3 |
| CH₃ | NHSO₂iC₃H₇ | CH₃ | CH₃ | CH₃ | C₄H₉ | 2 |
| Cl | NHCOCH₃ | OCH₃ | CH₃ | CH₃ | C₃H₇ | 5 |
| Br | NHCOCH₃ | OCH₃ | H | iC₃H₇ | (CH₂)C₆H₅ | 5 |
| Br | NHCOCH₃ | O(CH₂)₂OCH₃ | H | C₃H₇ | C₃H₇ | 5 |
| CF₃ | NHCOCH₃ | OC₂H₅ | H | C₂H₅ | (CH₂)₃OC₆H₅ | 5 |
| CH₃ | NHCOC₂H₅ | OCH₃ | H | C₂H₅ | cycloC₆H₁₁ | 4 |
| Cl | NHSO₂CH₃ | OCH₃ | H | C₄H₉ | C₂H₅ | 4 |
| Br | NHSO₂CH₃ | OCH₃ | CH₃ | CH₃ | C₅H₁₁ | 4 |
| F | NHSO₂CH₃ | OC₂H₅ | CH₃ | C₃H₇ | (CH₂)₄OC₂H₅ | 3 |
| F | NHSO₂C₂H₅ | OCH₃ | H | C₃H₇ | C₃H₇ | 3 |
| OCH₃ | NHSO₂C₄H₉ | OCH₃ | H | C₄H₉ | (CH₂)₂O(CH₂)₂OCH₃ | 2 |

TABLE 15

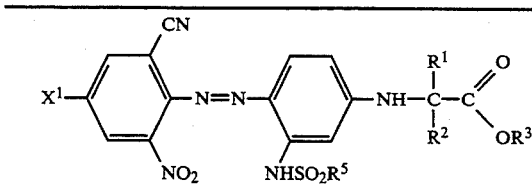

| X¹ | R⁵ | R¹ | R² | R³ | Hue on PES |
|---|---|---|---|---|---|
| Cl | iC₃H₇ | CH₃ | CH₃ | ((CH₂)₂O)₂C₂H₅ | 3 |
| Cl | C₃H₇ | C₄H₉ | CH₃ | C₂H₅ | 3 |
| Br | C₂H₅ | C₂H₅ | C₂H₅ | C₄H₉ | 3 |
| Br | C₃H₇ | CH₃ | CH₃ | (CH₂)₃C₆H₅ | 3 |
| F | CH₃ | CH₃ | CH₃ | CH₂CH=CH₂ | 1–2 |
| CF₃ | C₃H₇ | H | C₃H₇ | C₃H₇ | 4 |

TABLE 16

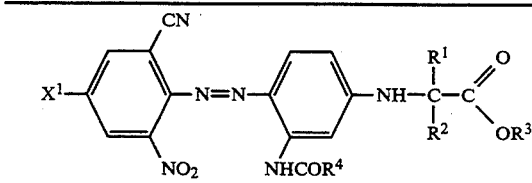

| X¹ | R⁴ | R¹ | R² | R³ | Hue on PES |
|---|---|---|---|---|---|
| Cl | CH₃ | CH₃ | CH₃ | CH₂CH₂Cl | 4 |
| Cl | iC₃H₇ | CH₃ | C₂H₅ | C₃H₇ | 4 |
| Br | CH₃ | H | C₃H₇ | cyclo C₆H₁₁ | 4 |
| Br | C₃H₇ | CH₃ | CH₃ | C₄H₉ | 4 |
| Br | iC₃H₇ | CH₃ | C₂H₅ | (CH₂)₂CN | 4 |

TABLE 17

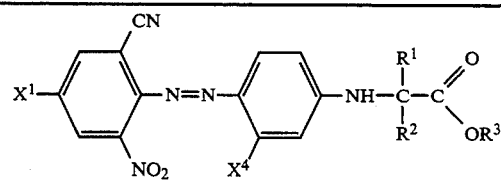

| X¹ | X⁴ | R¹ | R² | R³ | Hue on PES |
|---|---|---|---|---|---|
| Cl | OCH₃ | CH₃ | CH₃ | (CH₂)₃OCH₃ | 3 |
| Br | OCH₃ | CH₃ | CH₃ | C₄H₉ | 3 |
| Br | OCH₃ | CH₃ | CH₃ | (CH₂)₃CN | 3 |
| Br | OCH₃ | CH₃ | C₂H₅ | C₂H₅ | 3 |
| CF₃ | OCH₃ | H | C₃H₇ | cycloC₅H₉ | 4 |
| CF₃ | OCH₃ | C₂H₅ | C₂H₅ | C₃H₇ | 4 |
| CH₃ | OCH₃ | CH₃ | CH₃ | (CH₂)₃COOC₄H₉ | 1–2 |
| Cl | CH₃ | CH₃ | CH₃ | iC₄H₉ | 3 |
| Cl | CH₃ | H | C₄H₉ | sec.C₄H₉ | 3 |
| Br | CH₃ | CH₃ | CH₃ | C₄H₉ | 3–4 |
| Br | CH₃ | C₂H₅ | C₂H₅ | (CH₂)₃OC₂H₅ | 3–4 |
| CF₃ | CH₃ | CH₃ | CH₃ | C₃H₇ | 4–5 |
| F | CH₃ | CH₃ | CH₃ | C₂H₅ | |
| | | | | CH₂C₆H₅ | 2–3 |
| Cl | H | CH₃ | CH₃ | (CH₂)₄OCH₂CH=CH₃ | 2 |
| Cl | H | H | C₃H₇ | Tetrahydrofurfuryl | 2 |
| Br | H | CH₃ | CH₃ | (CH₂)₂COOC₄H₉ | 2 |
| Br | H | CH₃ | CH₃ | iC₃H₇ | 2 |
| F | H | C₂H₅ | C₂H₅ | C₂H₅ | 1–2 |
| CH₃ | H | H | C₂H₅ | CH(C₂H₅)₂ | 1–2 |
| Cl | Cl | CH₃ | CH₃ | C₄H₉ | 2 |
| Br | Cl | CH₃ | CH₃ | C₆H₅ | 2 |
| Br | Cl | C₂H₅ | C₂H₅ | (CH₂)₂OC₆H₅ | 2 |
| CF₃ | Cl | H | C₂H₅ | C₃H₇ | 2–3 |

TABLE 18

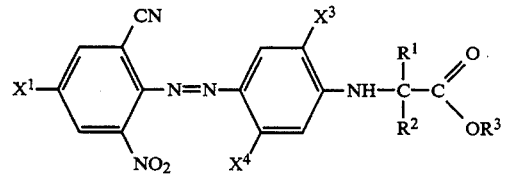

| X¹ | X³ | X⁴ | R¹ | R² | R³ | Hue on PES |
|---|---|---|---|---|---|---|
| Cl | Cl | NHSO₂C₂H₅ | CH₃ | CH₃ | C₄H₉ | 3 |
| Br | Cl | NHSO₂CH₃ | CH₃ | C₂H₅ | (CH₂)₃CN | 3 |
| Br | Cl | NHSO₂C₃H₇ | CH₃ | CH₃ | CH₂CH=CH₂ | 3 |
| F | Cl | NHSO₂iC₄H₉ | CH₃ | CH₃ | C₃H₇ | 2 |
| Cl | OCH₃ | CH₃ | CH₃ | CH₃ | iC₃H₇ | 4–5 |
| Br | OCH₃ | CH₃ | C₂H₅ | C₂H₅ | C₄H₉ | 4–5 |
| Br | OCH₃ | CH₃ | CH₃ | CH₃ | (CH₂)₃OC₆H₅ | 4–5 |
| F | OCH₃ | CH₃ | H | C₄H₉ | C₂H₅ | 3–4 |
| CF₃ | OCH₃ | CH₃ | CH₃ | C₂H₅ | iC₄H₉ | 5 |
| Cl | CH₃ | CH₃ | CH₃ | CH₃ | C₃H₇ | 3–4 |
| Br | CH₃ | CH₃ | H | CH₃ | (CH₂)₄O—COC₂H₅ | 3–4 |
| Cl | OCH₃ | Cl | CH₃ | CH₃ | (CH₂)₂COOiC₃H₇ | 3 |
| Br | OCH₃ | Cl | C₂H₅ | C₂H₅ | C₄H₉ | 3 |
| Br | OCH₃ | Cl | CH₃ | CH₃ | iC₃H₇ | 3 |
| Cl | Cl | H | C₂H₅ | C₂H₅ | C₅H₉ | 1–2 |
| Br | Cl | H | C₂H₅ | nC₄H₉ | ((CH₂)₄O)₂CH₃ | 1–2 |
| CF₃ | Cl | H | CH₃ | C₂H₅ | CH₂CH=CH₂ | 2–3 |
| Cl | OCH₃ | H | CH₃ | CH₃ | C₃H₇ | 2 |
| Br | OCH₃ | H | H | C₂H₅ | CH₂C₆H₅ | 2 |
| CF₃ | OC₂H₅ | H | H | C₃H₇ | (CH₂)₄CN | 3 |
| Cl | OCH₃ | OCH₃ | CH₃ | CH₃ | CH₃ | 5 |
| Cl | OCH₃ | OCH₃ | H | CH₃ | (CH₂)₂OC₄H₉ | 5 |
| Br | OCH₃ | OCH₃ | CH₃ | C₂H₅ | C₄H₉ | 5 |
| F | OCH₃ | OCH₃ | CH₃ | CH₃ | iC₄H₉ | 4 |
| OCH₃ | OC₂H₅ | OC₂H₅ | H | C₃H₇ | sec.C₄H₉ | 3 |
| Br | H | CH₃ | C₃H₇ | C₃H₇ | C₂H₅ | 3–4 |
| CF₃ | H | CH₃ | CH₃ | CH₃ | C₃H₇ | 4–5 |
| F | | | C₂H₅ | CH₃ | CH₃ | C₂H₅ | 3 |
| CF₃ | | | C₃H₇ | CH₃ | CH₃ | (CH₂)₂OC₆H₅ | 5 |
| OC₂H₅ | | | C₄H₉ | CH₃ | C₂H₅ | iC₄H₉ | 2 |
| CH₃ | | | CH₃ | C₂H₅ | C₂H₅ | CH₃ | 2 |
| CH₃ | | | C₂H₅ | H | C₂H₅ | (CH₂)₂C₆H₅ | 2 |

We claim:

1. Azo dye of the general formula I

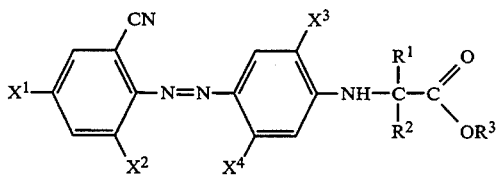

where $X^1$ is hydrogen, ($C_1$ to $C_6$) alkyl, cyclopentyl, cyclohexyl, fluorine, chlorine, bromine, trifluoromethyl or ($C_1$ to $C_4$) alkoxy which is unsubstituted or substituted by ($C_1$ to $C_4$) alkoxy or hydroxyl or both, $X^2$ is cyano $X^3$ is hydrogen, $X^4$ is $NHCOR^4$, $R^1$ is ($C_1$ to $C_6$) alkyl, $R^2$ is hydrogen or ($C_1$ to $C_6$) alkyl, $R^3$ is ($C_1$ to $C_8$) alkyl, ($C_1$ to $C_8$) alkyl which is a) interrupted by one or more oxygen atoms or b) monosubstituted or polysubstituted by chlorine, bromine, cyano, hydroxyl, phenyl, phenoxy, ($C_1$ to $C_8$) alkoxy, ($C_3$ to $C_5$) alkenyloxy, cyclopentyloxy, cyclohexyloxy, tetrahydrofurfuryl, tetrahydrofurfuryloxy, ($C_1$ to $C_4$) alkyltetrahydrofurfuryl, tetrahydropyronyl, ($C_1$ to $C_4$) alkyltetrahydropyronyl, ($C_1$ to $C_4$) alkoxycarbonyl, ($C_1$ to $C_4$) alkoxycarbonyloxy, ($C_1$ to $C_4$)alkylcarbonyloxy, ($C_3$ to $C_5$)alkenyloxycarbonyl, ($C_3$ to $C_5$) alkenyloxycarbonyloxy, cyclopentyloxycarbonyl, cyclohexyloxycarbonyl, phenoxycarbonyl, phenoxycarbonyloxy or phenylcarbonyloxy or both, of which phenoxycarbonyl, phenoxycarbonyloxy and phenylcarbonyloxy is each monosubstituted or polysubstituted in turn by ($C_1$ to $C_4$) alkyl, chlorine, bromine, or cyano or $R_3$ is ($C_1$ to $C_4$) alkyl which is both a) and b), or $R_3$ is ($C_3$ to $C_5$) alkenyl, cyclopentyl, cyclohexyl, tetrahydrofurfuryl, benzyl which is monosubstituted or polysubstituted by chlorine, bromine, nitro, cyano, ($C_1$ to $C_4$) - alkyl, ($C_1$ to $C_4$) - alkoxy, phenyl or ($C_1$ to $C_{16}$) alkyl which is interrupted by 2 or 3 oxygen atoms, $R^4$ is ($C_1$ to $C_8$) alkyl which is unsubstituted, monosubstituted or polysubstituted by fluorine, chlorine, bromine, hydroxyl or ($C_1$ to $C_4$) alkoxy, phenyl, ($C_1$ to $C_4$) alkoxy or phenoxy.

2. Azo dye according to claim 1, characterized in that $X^1$ is hydrogen, ($C_2$ or $C_3$) alkyl, ($C_2$ to $C_4$) alkoxy, fluorine, chlorine, bromine or trifluoromethyl.

3. Azo dye according to claim 1 characterized in that $R^4$ is ($C_1$ to $C_6$) alkyl.

4. Azo dye according to claim characterized in that $R^4$ is ($C_1$ to $C_4$) alkyl.

5. Azo dye according to claim 1 characterized in that $R^1$ is ($C_1$ to $C_4$) alkyl and $R^2$ is ($C_2$-$C_4$) alkyl.

6. Azo dye according to claim 5 characterized in that $R^1$ is ($C_1$ to $C_3$) alkyl and $R^2$ is ($C_1$ or $C_2$) alkyl.

7. The azo dye as claimed in claim 6, wherein $R^3$ is an alkyl of 1 to 8 carbon atoms, phenyl, substituted alkyl of 1 to 3 carbon atoms, cyano- or chlorine-substituted alkyl of 2 or 3 carbon atoms, alkyl of 2 to 4 carbon atoms substituted by alkoxy of 1 to 4 carbon atoms, alkenyloxy of 3 to 5 carbon atoms, phenoxy or an alkanol of 3 to 5 carbon atoms.

8. Azo dye according claim 1 characterized in that $R^3$ is ($C_1$ to $C_8$) alkyl, ($C_3$ to $C_5$) alkenyl, phenyl-substituted ($C_1$ to $C_3$) alkyl, cyano- or chlorine-substituted ($C_2$ or $C_3$) alkyl, or ($C_1$ to $C_4$) alkoxy- or ($C_3$ to $C_5$) alkenyloxy- or phenoxy-substituted ($C_2$ to $C_4$) alkyl.

9. Azo dye of the general formula I

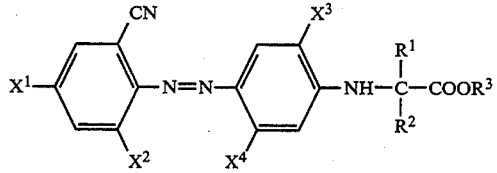

where $X^1$ is ($C_1$-$C_6$)alkyl, chlorine or bromine $X^2$ is cyano $X^3$ is hydrogen $X^4$ is $NHCOR^4$ $R^1$ is ($C_1$-$C_6$)alkyl $R^2$ is hydrogen or ($C_1$-$C_6$)alkyl $R^3$ is ($C_1$-$C_8$)alkyl $R^4$ is ($C_1$-$C_8$)alkyl.

10. The azo dye as claimed in claim 9, wherein $R^1$ is ($C_1$ to $C_4$)alkyl and $R^2$ is ($C_1$-$C_4$)alkyl.

11. The azo dye as claimed in claim 10, wherein $R^1$ is ($C_1$ to $C_3$)alkyl and $R^2$ is ($C_1$ or $C_2$)alkyl.

* * * * *